United States Patent [19]

Corniani et al.

[11] Patent Number: 5,058,731
[45] Date of Patent: Oct. 22, 1991

[54] APPARATUS FOR CONVEYING PRODUCTS

[75] Inventors: Carlo Corniani, Marmirolo; Claudio Sogliani, Cerese Di Virgilio, both of Italy

[73] Assignee: Azionaria Costruzioni Macchine Automatiche A.C.M.A. S.p.A., Bologna, Italy

[21] Appl. No.: 527,400

[22] Filed: May 23, 1990

[30] Foreign Application Priority Data

Jun. 7, 1989 [IT] Italy .................................. 3504 A/89

[51] Int. Cl.$^5$ .............................................. B65G 29/00
[52] U.S. Cl. ............................ 198/803.01; 198/803.5; 198/803.11
[58] Field of Search ............. 198/468.4, 471.1, 803.01, 198/803.11, 803.3, 803.5, 803.9

[56] References Cited

U.S. PATENT DOCUMENTS

| | | | |
|---|---|---|---|
| 3,834,522 | 9/1974 | Jackson | 198/471.1 |
| 3,961,697 | 6/1976 | Hartman et al. | 198/803.5 X |
| 4,773,525 | 9/1988 | Gertitschke et al. | 198/471.1 |

FOREIGN PATENT DOCUMENTS

| | | |
|---|---|---|
| 0355971 | 2/1990 | European Pat. Off. |
| 3143511 | 5/1983 | Fed. Rep. of Germany |

*Primary Examiner*—Joseph E. Valenza
*Assistant Examiner*—Tuan N. Nguyen
*Attorney, Agent, or Firm*—Guido Modiano; Albert Josif

[57] ABSTRACT

The apparatus for conveying containers in a filling machine comprises a rotary conveyor which has a plurality of mutually angularly equidistant sucker holder elements, each of which is adapted to accommodate a related container. Each sucker holder element is mounted so as to be radially slidable on the rotary conveyor, and adjustment elements are provided for modifying, in a radial direction with respect to the rotary conveyor, the position of the holder elements so as to adapt the apparatus for handling containers of various sizes without requiring the replacement of mechanical parts.

7 Claims, 3 Drawing Sheets

APPARATUS FOR CONVEYING PRODUCTS

BACKGROUND OF THE INVENTION

The present invention relates to an apparatus for conveying products.

More in particular, the present invention relates to an apparatus of the above mentioned type which is adapted to be used for example to convey containers in a filling machine.

The fact that reference is made, in the following description, to containers handled by a filling machine naturally does not limit in any way the field of application of the present invention.

As known, in filling machines the containers are conveyed by rotary conveyors which are peripherally provided with a plurality of equidistant seats adapted to accommodate respective containers.

In a machine of the above described type it is considerably troublesome, and therefore expensive, to adapt the machine for handling containers with dimensions which differ from those for which the machine has been previously set up. If it is necessary to change the dimensions of the containers to be treated, the seats for the containment of said containers must in fact be modified, and this can be achieved only by replacing mechanical parts and by performing laborious adjustments. This fact naturally also reflects in down time during which the machines involved remain unproductive.

The containers accommodated in said seats of filling machines of the conventional type are furthermore retained within said seats by fixed guides against which the containers slide while being conveyed.

This sliding action is the source of considerable disadvantages, since it causes damage to the containers which, especially if they are made of transparent material or if they have silk-screen surface printings, are subject to abrasions which can significantly worsen their appearance.

SUMMARY OF THE INVENTION

The aim of the present invention is to provide an apparatus for conveying products in which it is possible to vary the dimensions of the treated products by means of simple adjustments, without replacing mechanical parts and by means of operations which require only a very short time to carry out.

A further object of the present invention is to provide an apparatus of the above described type in which the containers are handled in a very delicate manner.

According to the present invention, an apparatus for conveying products is provided which comprises conveyor means, constituted by a rotary conveyor having a plurality of mutually angularly equidistant holder means, each of which is adapted to accommodate a related product, characterized in that each of said holder means is mounted so as to be slidable along a substantially radial direction on said rotary conveyor, adjustment means being provided for modifying the position of said holder means in a substantially radial direction with respect to said rotary conveyor.

BRIEF DESCRIPTION OF THE DRAWINGS

The present invention will now be described with reference to the accompanying drawings, which illustrate a non-limitative embodiment thereof, wherein.

DESCRIPTION OF THE PREFERRED EMBODIMENTS

Figure 1:
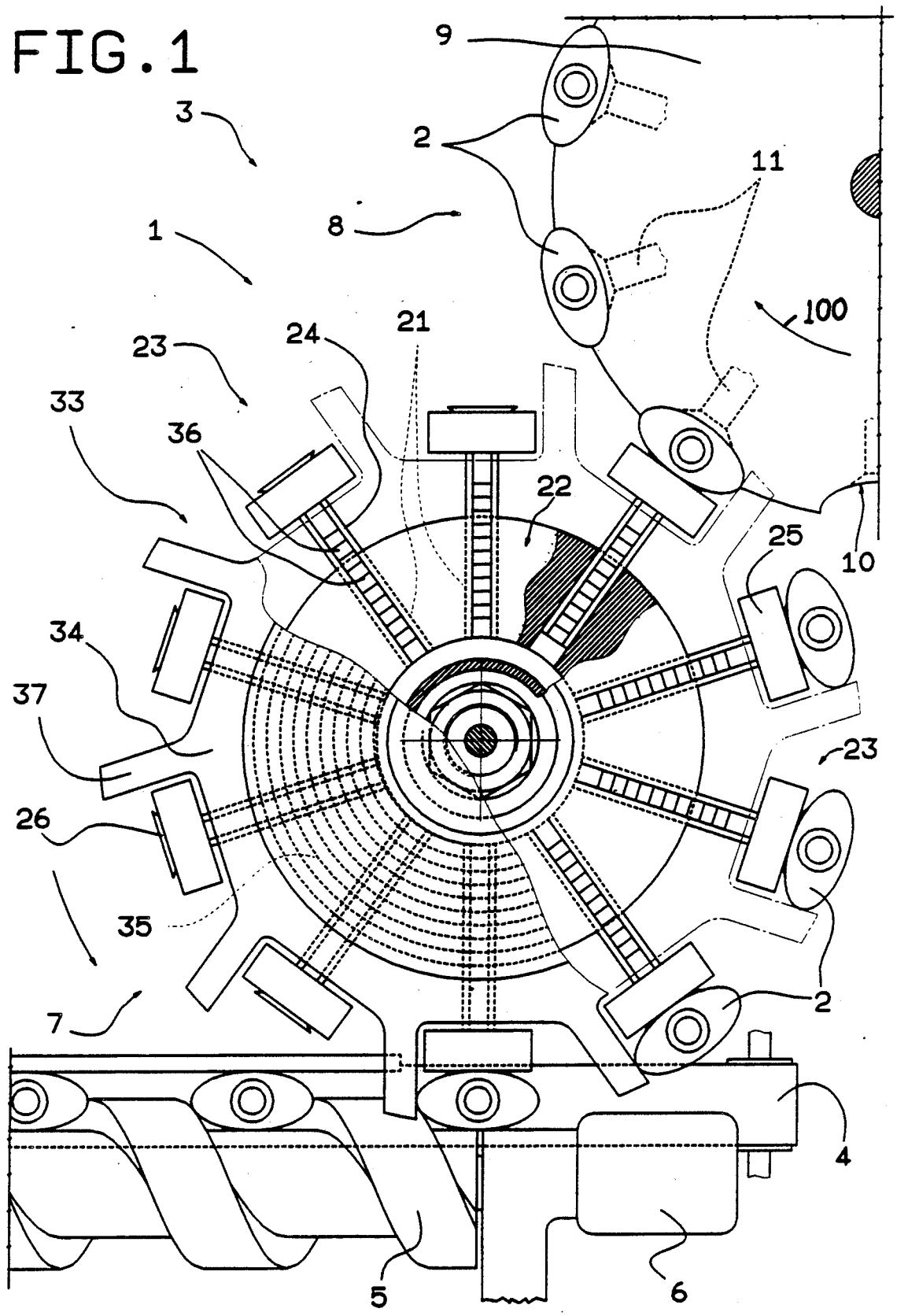
FIG. 1 is a schematic plan view, wherein some details have been removed for the sake of clarity, of a filling machine which includes an apparatus according to the present invention.

With reference to FIG. 1, the reference numeral 1 generally indicates an apparatus for the transfer of products, constituted for example by containers 2. The apparatus may constitute part of a machine for filling containers 2 with liquid substances which is only partially illustrated and is generally indicated by 3.

The transfer apparatus 1 comprises feeder means constituted by a horizontal belt conveyor 4 a first portion whereof is arranged to the side of, and is partially surmounted by, a worm-screw or auger conveyor 5 which is driven by a motor 6 and is capable of transferring the containers 2 in succession toward a rotary conveyor 7, adapted to transfer the containers 2 along a curved path. The conveyor 7 passes containers 2 in succession to a rotary filling conveyor 8 which, in a manner which is known and thus not described, fills the containers 2 with a liquid and conveys them to a closure station, which is not illustrated for clarification purposes.

The filling conveyor 8 essentially comprises a drum 9 with a vertical axis which rotates in a clockwise direction as indicated by the arrow 100 in FIG. 1. The filling conveyor 8 peripherally supports a plurality of mutually equidistant housings or seats 10, each of which is adapted to accommodate a container 2 and to retain it by means of suction means constituted for example by a sucker 11.

Figure 2:
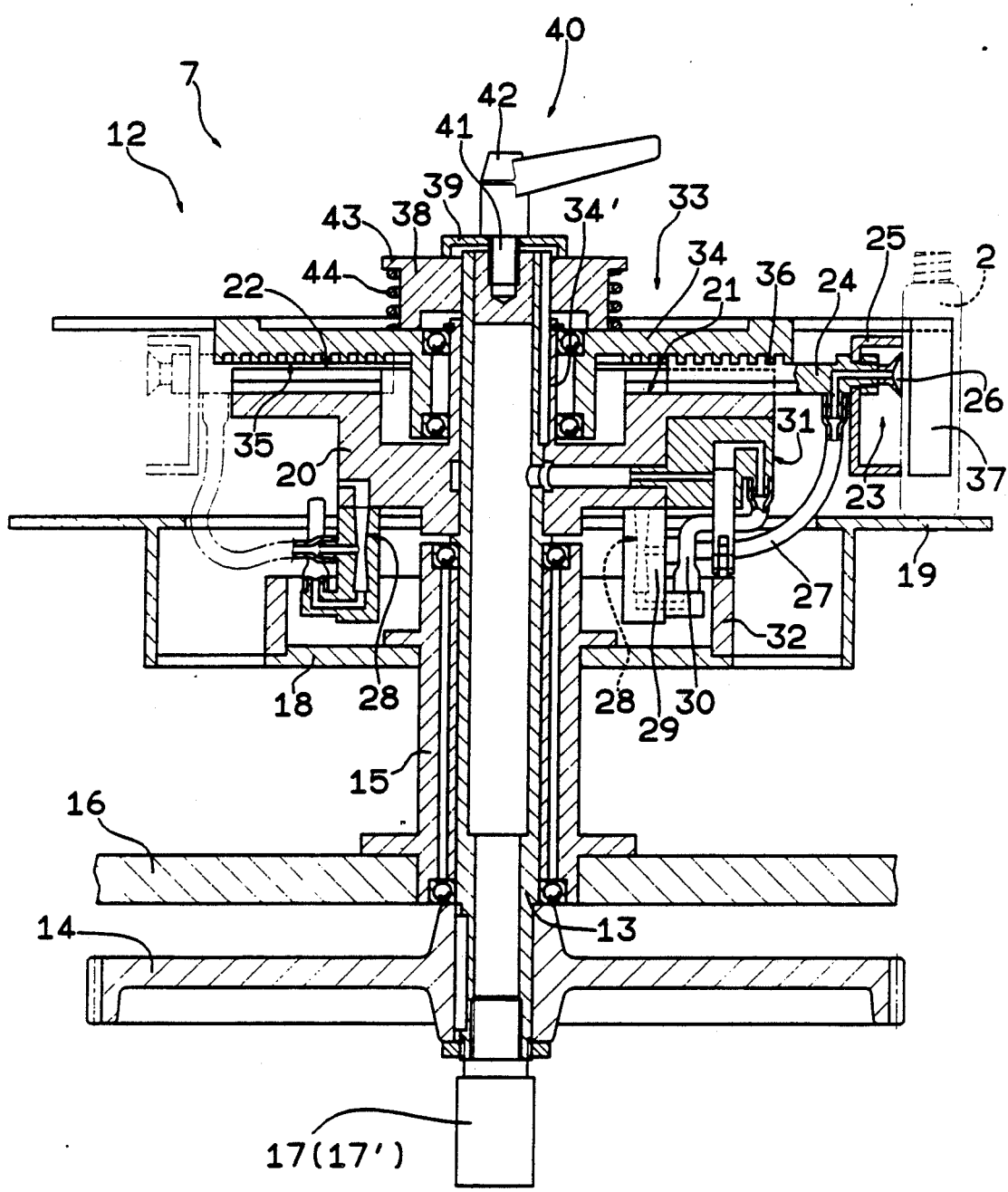
FIG. 2 is a schematic elevation view of the apparatus of FIG. 1.

With particular reference to FIG. 2, the conveyor 7 comprises a rotary conveyor element 12 with a vertical axis which is adapted to transfer the containers 2 along a curved path by rotating anti-clockwise. Said rotary conveyor element 12 is keyed on the upper portion of a vertical hollow shaft 13 which is rotated by motor means, not illustrated, by means of a gearwheel 14 which is keyed to its lower end. The shaft 13 is rotatably supported, below the conveyor element 12, by means of a sleeve 15 which is rigidly associated with a horizontal wall 16, advantageously constituting a portion of the base of the filling machine 3, and being arranged coaxial to a lower portion of said shaft 13. Due to reasons which will become apparent hereinafter, said lower portion is connected to a source of compressed air 17.

A cup-shaped body 18, with its concavity directed upward, is coaxially connected to an upper portion of the sleeve 15 and coaxially supports an annular supporting element 19 which is arranged horizontally.

The conveyor element 12 comprises a cup-like body 20 which has its concavity directed upward, is keyed coaxially on the shaft 13 directly above the sleeve 15 and supports, in an upward position, a plurality of radially slidable retention elements or holder means 23 (ten in the illustrated case) by means of radial rails 21 defined in an upper surface 22 of said body 20.

Each retention element 23 comprises a slider 24 adapted to slide within a respective rail 21, which supports a rest element 25 at an end thereof directed toward the outside of the conveyor element 12. A retention means, constituted by a sucker 26, protrudes toward the outside of the conveyor element 12 through each rest element 25.

Each sucker 26 communicates through a duct 27, to an intermediate portion of a vertical duct 28 which is defined in a block 29, supported by a lower wall of the cup-like body 20. The duct 28 has an upper end which communicates with the atmosphere and a lower end connected, by means of a duct 30, to a valve element 31 which is also supported by a lower portion of the cup-like body 20.

Each of the ducts 28 is in the shape of a Venturi tube and has an intermediate neck-like portion to which the duct 27 leads.

Each valve element 31 has its own inlet connected to the inside of the hollow shaft 13 which, according to what has been described, is connected to the compressed air source 17, and has its outlet connected to the lower end of the related duct 28. Each valve element 31 can be actuated, so as to activate or cutoff the connection between the related sucker 26 and the inside of the hollow shaft 13, by a fixed cam means 32 which is supported by the upper surface of the cup-like body 18.

An adjustment means 33 abuts against the upper surface of the sliders 24 and comprises a disk-like element 34 which is rotatably and coaxially supported by the shaft 13 by means of a sleeve 34', coaxial to said shaft 13 and constituting an upper extension of a central portion of the cup-like body 20. Said disk-like element 34 is traversed, in a downward position, by an actuation means, advantageously constituted by a planar thread 35, which can have one or more starts. The thread 35 substantially has the shape of an Archimedean spiral and grips engagement means, expediently constituted by flanking grooves 36, provided on the upper surface of the sliders 24.

Follower elements 37, equal in number to the suckers 26, extend toward the outside of the conveyor element 12 from the disk-like element 34 and are, in a rearward position (with reference to the direction of rotation of the conveyor 7), in contact with the containers 2 which, as will become apparent hereinafter, are retained by the suckers 26 during the rotation of the conveyor element 12.

Above the disk-like element 34, the shaft 13 coaxially and rotatably supports a tubular element 38 which rests, with its lower end, on the upper surface of the disk-like element 34 and is surmounted by a plate 39 which is coaxial to the shaft 13 and is in turn surmounted by a locking element 40. Said locking element 40 is constituted by a vertical stem 41 which is threaded and screwed on the upper end of the shaft 13 in a downward position and has an actuation handgrip 42 in an upward position. The upper end of the tubular element 38 has a lateral annular protrusion 43 which acts against, in an upward position, a helical spring 44 which is coiled around said tubular element 38 and has a lower end arranged in contact with the upper surface of the disk-like element 34.

In use, the containers 2 are fed in succession, by means of the belt conveyor 4 and the auger conveyor 5, into contact with respective rest elements 25 and with respective follower elements 37 of the conveyor element 12. The containers 2 are retained in contact with said follower elements 37 by the related suckers 26. The suckers 26 in fact start to aspirate at the instant in which they receive a container 2, since the valve element 31, under the action of the cam means 32, connects said end of the duct 27 to the inner cavity of the shaft 13, which communicates with the compressed air source 17.

The containers 2, sliding on the upper surface of the annular element 19, are then conveyed in succession into respective seats 10 of the filling conveyor 8 to which said containers 2 are passed as a consequence of a further actuation of the valve element 31 by the cam means 32.

If it is necessary to adapt the filling machine 3 to the handling of containers with different dimensions with respect to those of the containers 2 for which the machine 3 was preset, it is first of all necessary, with the machine 3 stopped, to unscrew the stem 41 of the locking element 40 by acting on the actuation handgrip 42. The disk-like element 34 must then be rotated manually about its own axis, in one direction or the other, so as to cause, by virtue of the engagement of the planar thread 35 with the grooves 36 of the sliders 24, the approach or respectively the spacing-apart of said sliders 24 from the axis of the shaft 13. Said approach or spacing-apart has the effect of modifying the position of the suckers 26 so as to create, between the pairs of contiguous follower elements 37, a space with such dimensions as to be able to accommodate, in a correct position, a container with different dimensions.

After the suckers 26 have assumed their new position, the disk-like element 34 must then be positioned, with a small rotation about its own axis which does not appreciably affect the position assumed by the suckers 26, so that the follower elements 37 become arranged in such a position as to correctly contact, in a rearward position with reference to the direction of rotation of the conveyor 7, the containers with different dimensions which said conveyor 7 is to convey.

The stem 41 of the locking element 40 is then screwed back onto the shaft 13 by acting on the actuation handgrip 42 so as to cause the tubular element 38 to firmly engage the upper surface of the disk-like element 34 in abutment engagement relationship therewith, and to rigidly reassociate said disk-like element 34 with the shaft 13.

After these simple adjustments, and with no replacement of any mechanical parts, the machine is adjusted for the handling of differently sized containers and is ready to be restarted.

Obviously, numerous variations of the apparatus 1 are possible, without thereby abandoning the scope of the present invention, and without altering the concept of the invention.

According to another embodiment of the present invention which is not illustrated, the follower elements 37 may be omitted, since the suckers 26 may be used alone to keep the containers 2 arranged in contact with the rest elements 25.

The disk-like element 34 may furthermore be replaced with any equivalent kinematic system capable of producing the described radial movements of the sliders 24.

It should be furthermore noted that, as an alternative to what has been described, the suckers 26 may lead directly, by means of the related valve elements 31, to a suction pump 17' instead of to the compressed air source 17.

Figure 3:
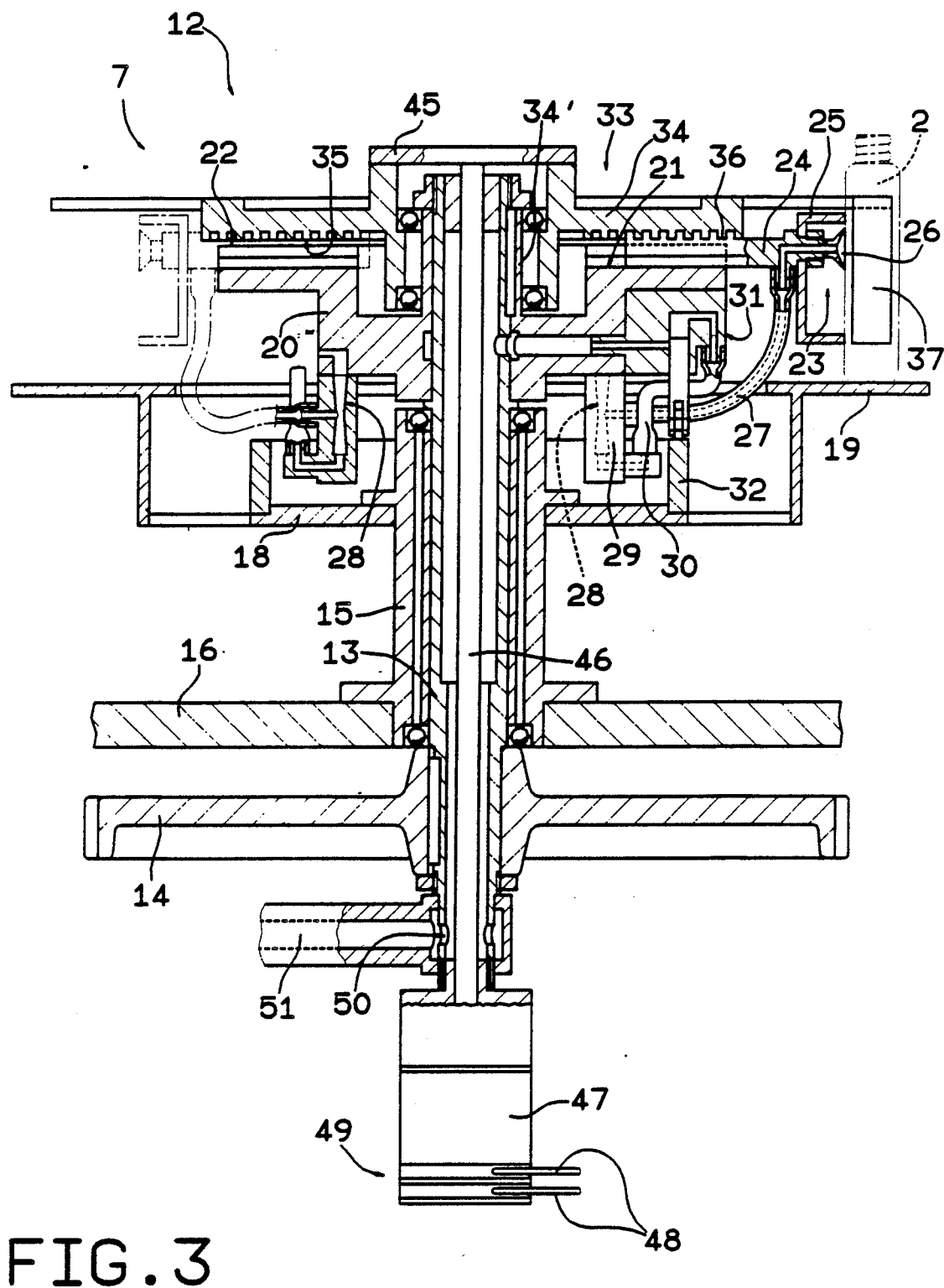
FIG. 3 is a schematic elevation view of a further embodiment of the apparatus of FIG. 2.

According to a further embodiment of the present invention, illustrated in FIG. 3, the disk-like element 34 is connected, in an upward position, to a circular plate 45 which is coaxial to the shaft 13 and is keyed to the upper end of a shaft 46 which is contained coaxially within said shaft 13.

The lower end of the shaft 46 protrudes downward from the shaft 13 and is connected to the output shaft of a motor 47 which is constituted, for example, by a step motor powered by means of sliding brushes 48 arranged resting on a commutator 49 of said motor 47.

Below the gearwheel 14, the inner cavity of the shaft 13 communicates, by means of holes 50 defined in the surface of said shaft 13, with a duct 51 which leads to a source of suction which is not illustrated.

In use, if it is necessary to adapt the filling machine 3 to the handling of containers with dimensions differing from those of the containers 2 for which the machine 3 has been preset, it is sufficient to activate the motor 47 so as to cause such a rotation of the disk-like element 34 so as to produce, by virtue of the engagement of the planar thread 35 with the grooves 36 of the sliders 24, the approach or respectively the spacing-apart of said sliders 24 from the axis of the shaft 13.

When the suckers 26 have assumed a new position which is substantially adapted to allow the handling of the containers with new dimensions, the disk-like element 34 is positioned by the motor 47 so that the follower elements 37 arrange themselves in such a position as to correctly adhere in a rearward position to the containers with new dimensions which said conveyor 7 is to convey.

From what has been described it is evident that the described apparatus 1 allows to vary the size of the treated products by means of simple adjustments, without replacing mechanical parts and with operations which require extremely short times.

It is furthermore evident that the absence of fixed elements against which the containers 2 may drag ensures a particularly delicate handling of said containers by the conveyor 7.

We claim:

1. Apparatus for conveying products comprising conveyor means constituted by a rotary conveyor having a plurality of mutually angularly equidistant holder means, each adapted to accommodate a related product, wherein each of said holder means is mounted so as to be slidable along a substantially radial direction on said rotary conveyor, adjustment means being provided for modifying the position of said holder means in a substantially radial direction with respect to said rotary conveyor, said holder means comprising sucker means which are supported by related slider elements which are radially slidable with respect to said radial conveyor, said slider elements having engagement means for said adjustment means, said adjustment means comprising actuation means which are coupled to said engagement means and are adapted to cause radial movements of said slider elements with respect to said rotary conveyor, and wherein said adjustment means comprise a disk-like element which is coaxial to said rotary conveyor and comprises a planar spiral thread which is a part of said actuation means and grips said engagement means, said engagement means comprising grooves which are provided on a surface of said slider elements and grip said planar spiral thread.

2. Apparatus according to claim 1, wherein each of said holder means comprises a follower element which is rotatable together with said rotary conveyor and is arranged, with respect to the related sucker means, upstream with reference to the direction of rotation of said rotary conveyor, and wherein said follower elements are rigidly associated with said disk-like element.

3. Apparatus according to claim 1, further comprising motor means adapted to act on said adjustment means to vary the position of said holder means.

4. Apparatus according to claim 3, wherein said motor means comprise a step motor.

5. Apparatus according to claim 3, wherein said sucker means lead to a neck of a duct which is internally shaped like a Venturi tube, a source of compressed air being provided, valve means being furthermore provided to connect said compressed air source to an end of said duct.

6. Apparatus according to claim 3, wherein said sucker means lead to a suction pump, valve means being provided to connect said sucker means to said suction pump.

7. Apparatus for conveying products comprising conveyor means constituted by a rotary conveyor having a plurality of mutually angularly equidistant holder means, each adapted to accommodate a related product (2), each of said holder means being mounted so as to be slidable along a substantially radial direction on said rotary conveyor, adjustment means being provided for modifying the position of said holder means in a substantially radial direction with respect to said rotary conveyor, said holder means being supported by related slider elements which are radially slidable with respect to said radial conveyor, said slider elements having engagement means for said adjustment means, said adjustment means comprising actuation means which are coupled to said engagement means and are adapted to cause simultaneously equal radial movements of all of said slider elements with respect to said rotary conveyor.

* * * * *